(12) United States Patent
Backström (10) Patent No.: US 10,139,485 B2
(45) Date of Patent: Nov. 27, 2018

(54) DEVICE AND METHOD FOR COLLISION RISK MANAGEMENT FOR VEHICLES

(71) Applicant: BAE Systems Hägglunds Aktiebolag, Örnsköldsvik (DE)

(72) Inventor: Ronny Backström, Umeå (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 293 days.

(21) Appl. No.: 14/913,268

(22) PCT Filed: Jun. 12, 2014

(86) PCT No.: PCT/SE2014/050713
§ 371 (c)(1),
(2) Date: Feb. 19, 2016

(87) PCT Pub. No.: WO2015/026279
PCT Pub. Date: Feb. 26, 2015

(65) Prior Publication Data
US 2016/0209507 A1    Jul. 21, 2016

(30) Foreign Application Priority Data
Aug. 21, 2013   (SE) ...................................... 1350963

(51) Int. Cl.
*G01S 13/93*     (2006.01)
*G06K 9/00*      (2006.01)
(Continued)

(52) U.S. Cl.
CPC .......... *G01S 13/931* (2013.01); *G01S 13/862* (2013.01); *G01S 13/865* (2013.01); *G01S 13/867* (2013.01);
(Continued)

(58) Field of Classification Search
CPC ... G06K 9/00805; G01S 13/04; G01S 13/862; G01S 13/865; G01S 13/867; G01S 13/931
See application file for complete search history.

(56) References Cited

U.S. PATENT DOCUMENTS

| | | | | |
|---|---|---|---|---|
| 7,107,129 B2 * | 9/2006 | Rowe | ..................... | A62C 27/00 169/24 |
| 7,451,028 B2 * | 11/2008 | Pillar | ..................... | A62C 27/00 169/24 |

(Continued)

FOREIGN PATENT DOCUMENTS

| | | |
|---|---|---|
| JP | 2001-180374 A | 7/2001 |
| JP | 2003-118996 A | 4/2003 |
| KR | 10-0713554 B1 | 4/2007 |

OTHER PUBLICATIONS

Extended European Search Report received for European Patent Application No. 14837820.1, dated Feb. 17, 2017, 7 pages.
(Continued)

*Primary Examiner* — Peter M Bythrow
(74) *Attorney, Agent, or Firm* — Morrison & Foerster LLP (57) ABSTRACT

A device, a motor vehicle equipped with the device, a method, and a computer program product including program code to implement the method, for collision risk management pertaining to a vehicle including portions projecting outside a basic configuration of the vehicle, including determining a surrounding configuration as basis for collision risk determination, determining presence of portions projecting outside the basic configuration, determining if collision risk is present at the thus determined surrounding configuration and the thus determined total vehicle configuration, and for an operator of the vehicle indicating the thus determined collision risk.

18 Claims, 5 Drawing Sheets

(51) Int. Cl.
*G01S 15/93* (2006.01)
*G01S 17/93* (2006.01)
*G01S 17/02* (2006.01)
*G01S 15/02* (2006.01)
*G01S 13/86* (2006.01)
*F41H 7/02* (2006.01)

(52) U.S. Cl.
CPC .......... *G01S 15/025* (2013.01); *G01S 15/931* (2013.01); *G01S 17/023* (2013.01); *G01S 17/936* (2013.01); *G06K 9/00805* (2013.01); *F41H 7/02* (2013.01)

(56) References Cited

U.S. PATENT DOCUMENTS

| | | | | |
|---|---|---|---|---|
| 7,711,460 B2* | 5/2010 | Yakes | ...................... | B60K 6/46 318/139 |
| 7,715,962 B2* | 5/2010 | Rowe | ...................... | A62C 27/00 180/333 |
| 7,734,399 B2* | 6/2010 | Green | ...................... | B66C 23/78 701/300 |
| 8,428,827 B2* | 4/2013 | McKee | ...................... | F41A 23/24 700/85 |
| 8,833,232 B1* | 9/2014 | Fox | ...................... | F41A 27/18 89/41.06 |
| 2003/0163230 A1* | 8/2003 | Pillar | ...................... | A62C 27/00 701/1 |
| 2003/0171854 A1* | 9/2003 | Pillar | ...................... | A62C 27/00 701/1 |
| 2004/0069865 A1* | 4/2004 | Rowe | ...................... | A62C 27/00 239/146 |
| 2004/0199302 A1* | 10/2004 | Pillar | ...................... | A62C 27/00 701/1 |
| 2006/0064245 A1* | 3/2006 | Gilbert | ...................... | B60T 7/22 701/301 |
| 2008/0077327 A1* | 3/2008 | Harris | ...................... | B60R 9/04 701/301 |
| 2009/0121852 A1* | 5/2009 | Breuer | ...................... | G08G 1/165 340/436 |
| 2015/0145711 A1* | 5/2015 | Maddox | ...................... | G01S 13/931 342/27 |

OTHER PUBLICATIONS

International Search Report and Written Opinion received for PCT Application No. PCT/SE2014/050713, dated Sep. 26, 2014, 14 pages.

International Preliminary Report on Patentability received for PCT Patent Application No. PCT/SE2014/050713, dated Mar. 3, 2016, 10 pages.

* cited by examiner

Fig. 5

DEVICE AND METHOD FOR COLLISION RISK MANAGEMENT FOR VEHICLES

CROSS REFERENCE TO RELATED APPLICATIONS

This application is a U.S. National Stage patent application of PCT/SE2014/050713, filed on Jun. 12, 2014, which claims priority to Swedish Patent Application No. 1350963-3, filed on Aug. 21, 2013, each one of which is hereby incorporated by reference in entirety.

FIELD OF THE INVENTION

The present invention relates to a method for collision risk management pertaining to vehicles. The invention also relates to a computer program product comprising program code for a computer for implementing a method according to the invention. The invention also relates to device for collision risk management pertaining to vehicles and a vehicle being equipped with the device.

BACKGROUND OF THE INVENTION

At vehicles of today, for example military vehicles such as tanks, a number of system configurations for various purposes are used. Examples of such system configurations may be folding out system configurations, such as weapon systems or communication systems.

One kind of tank is equipped with a pivotable tower presenting a barrel, which barrel is vertically adjustable arranged. Said tank has a plurality of operators, such as a driver and a tower operator. These two operators have different working tasks, but a well-functioning cooperation between the two operators is necessary for safe operation and propulsion of said tank. Because of noisy environment and limited sight it is of outmost importance that communication between the tower operator and the driver is functioning well. However, it may arise situations when said driver is not completely aware of the rotation angle of the tower and the barrel orientation during propulsion of said tank. It may however also arise situations when said operator not is aware about if said system configurations are unfolded or not. Hereby said operator is not aware of which part is projecting from a basic configuration of the vehicle. In a similar way said tower operator, or another operator, for example a system configuration operator, is not aware of the current position of the vehicle and the intended travel path.

Hereby risk for collision between said system configurations comprising said barrel, and objects in the surroundings of the vehicle may arise. This risk may be fairly high due to said working environment for vehicle operators.

There is thus a need to provide means of assistance for reducing said collision risk between said vehicle and said objects in the environment of the vehicle, and in particular between projecting portions of the vehicle and said objects in the surroundings of the vehicle.

SUMMARY OF THE INVENTION

One object of the present invention is to provide a novel and advantageous method for collision risk management pertaining to vehicles.

Another object of the invention is to provide a novel and advantageous device and a novel and an advantageous computer program for collision risk management pertaining to vehicles.

Yet another object of the invention is to provide a method, a device and a computer program for achieving a user friendly and reliable collision risk management pertaining to vehicles.

Yet another object of the invention is to provide an alternative method, an alternative device and alternative computer program for collision risk management pertaining to vehicles.

Some of these objects are achieved by a collision risk management pertaining to vehicles according to the claims. Advantageous embodiments are depicted with reference to the claims.

According to an aspect of the invention there is provided a method for collision risk management pertaining to vehicles comprising portions projecting outside a basic configuration of said vehicle, which portions temporarily are changing said basic configuration. The method comprises the steps of:
  determining a surrounding configuration as basis for collision risk management;
  determining presence of portions projecting outside said basic configuration;
  determining if collision risk is present at the thus determined surrounding configuration and the thus determined total vehicle configuration; and
  for an operator of the vehicle, indicating the thus determined collision risk.

The step of determining presence of portions projecting outside said basic configuration may comprise the step of determining a total vehicle configuration. The total vehicle configuration considers portions of systems projecting from said basic configuration. Such systems may for example comprise a barrel carried by a tower of a tank. Other systems may comprise communication systems, weapon systems and/or counter-measure systems.

Said operator may be a driver of the vehicle. Said operator may be an operator for said projecting portions of the vehicle.

The method may comprise the steps of:
  determining suitable measures for managing the thus determined collision risk; and
  presenting the thus determined measures for said operator.

Preferably the vehicle is driven, wherein the surrounding configuration and hereby the collision risk are changing depending on the vehicle propulsion.

Said suggested measures may comprise change of vehicle propulsion and/or change of said determined vehicle configuration by means of said projecting portions. In some cases it might be easier and more time-effective to only change the vehicle propulsion for managing the determined collision risk. It may also be of outmost importance to maintain the position of the projecting portion, for example in cases where the projecting portion is a barrel and the barrel is positioned in a direction towards a hostile target.

The thus determined collision risk may be indicated by visual presentation via a presentation screen and/or periscope.

The method may comprise the steps of:
  updating a set of parameters representing said basic configuration; and
  determining said collision risk on the basis of said updated set of parameters.

The method may comprise the step of:
  continuously determining information about an intended future travel path. This may be performed in any suitable way, for example by considering a current position, current speed, terrain information, and/or predetermined final destination.

Said collision risk may be determined continuously based on among other things the intended travel path of the vehicle. The operator may thus be informed in good time about the collision risk and the operator may hereby take appropriate measures for managing said collision risk. Suitably a new travel path is automatically determined for avoiding collision, wherein the new travel path is presented for the operator.

Said projecting portion may comprise a pivotable and vertically adjustable barrel and a pivotable tower carrying said barrel.

According to an aspect of the invention there is provided a method for collision risk management pertaining to vehicles comprising portions projecting outside a basic configuration of said vehicle, which portions temporarily are changing said basic configuration. The method comprises the steps of:
  automatically determining a surrounding configuration as basis for a collision risk determination;
  automatically determining presence of portions projecting outside said basic configuration;
  automatically determining if collision risk is present at the thus determined surrounding configuration and the thus determined total vehicle configuration; and
  for an operator of the vehicle, automatically indicating the thus determined collision risk.

According to an aspect of the invention there is provided a method for collision risk management pertaining to vehicles comprising portions projecting outside a basic configuration of said vehicle, which portions temporarily are changing said basic configuration. The method comprises the steps of:
  manually determining a surrounding configuration as basis for collision risk management;
  automatically determining presence of portions projecting outside said basic configuration;
  determining if collision risk is present at the thus determined surrounding configuration and the thus determined total vehicle configuration; and
  for an operator of the vehicle, automatically indicating the thus determined collision risk.

Manual determination of said surrounding configuration may be performed by a generated and presented video stream presenting a surrounding of the vehicle, alternatively by means of manually looking outside the vehicle.

The method may be implemented in existing motor vehicles. Program code for collision risk management pertaining to vehicles according to the invention may be installed in a control unit of the vehicle during manufacturing of the same. A buyer of the vehicle may thus have the possibility to choose the function of the method as an option. Alternatively program code for performing the inventive method for collision risk management pertaining to vehicles may be installed in a control unit of the vehicle during upgrading at a service station. In this case software may be loaded into a memory of the control unit. Implementation of the inventive method is thus cost effective.

Program code for collision risk management pertaining to vehicles may be updated or exchanged. Further, different parts of said program code for collision risk management pertaining to vehicles may be exchanged independently of each other. This modular configuration is advantageous from a maintenance perspective.

According to an aspect of the invention there is provided a device for collision risk management pertaining to vehicles comprising portions projecting outside a basic configuration of said vehicle, which portions temporarily may change said basic configuration, comprising:
  means for determining a surrounding configuration as basis for collision management;
  means for determining presence of portions projecting outside said basic configuration;
  means for determining if collision risk is present at the thus determined surrounding configuration and the thus determined total vehicle configuration; and
  means for indicating the thus determined collision risk to an operator of a vehicle.

The device may comprise:
  means for determining suitable measures for managing the thus determined collision risk; and
  means for presenting the thus determined measures for said operator.

The device may comprise:
  means for determining the current propulsion of the vehicle and the current vehicle configuration of the vehicle.

The device may comprise:
  means for determining change of vehicle propulsion and/or change of said determined vehicle configuration by means of said projecting portions.

Said suggested measures may comprise information about change of vehicle propulsion and/or change of said determined vehicle configuration by means of said projecting portions.

The device may comprise:
  means for indicating the thus determined collision risk by visual presentation via visual presentation via presentation screen and/or periscope.

The device may comprise:
  means for updating a set of parameters representing said basic configuration;
  means for determining said collision risk on the basis of said updated set of parameters.

The device may comprise:
  means for continuously determining said collision risk on the basis of among other things the vehicles intended travel path.

Said projecting portions may comprise a pivotable and vertically adjustable barrel and a pivotable tower carrying said barrel.

According to an aspect of the present invention there is provided a motor vehicle comprising a device according to what is depicted herein.

The motor vehicle may be any of a military vehicle, terrain vehicle, forest machine or mining vehicle.

According to an aspect of the invention there is provided a computer program for collision risk management pertaining to vehicles comprising portions projecting outside a basic configuration of said vehicle, wherein said computer program comprises program code for causing an electronic control unit or an operation control unit connected to electronic control unit for performing the steps according to any of the claims.

According to an aspect of the invention there is provided a computer program for collision risk management pertaining to vehicles comprising portions projecting outside a basic configuration of said vehicle, wherein said computer program comprises program code stored on a, by a computer readable means, for causing an electronic control unit or another computer connected to the electronic control unit to perform the steps according to any of the claims.

According to an aspect of the invention there is provided a computer program product comprising a program code stored on a, by a computer readable, medium for performing the method steps according to any of the claims, when said computer program is run on an electronic control unit or another computer connected to an electronic control unit.

At said device said basic configuration may be updatable arranged for updating information for determining said collision risk.

Further objects, advantages and novel features of the present invention would become apparent to the one skilled in the art from the following details, and also by putting the invention into practice. Whereas the invention is described below, it should be noted that it is not restricted to the specific details described. Specialists having access to the teaching herein would recognise further applications, modifications and incorporations with other features, within other fields, which are within the scope of the invention.

BRIEF DESCRIPTION OF THE DRAWINGS

For a fuller understanding of the present invention and further objects and advantages thereof, it is hereby made reference to the detailed description below which should be read together with the accompanying drawings, in which the same reference notations note similar items in the various diagrams, and in which FIG. 1 schematically illustrates a vehicle, according to an embodiment of the invention.

DETAILED DESCRIPTION OF THE INVENTION

Figure 1:
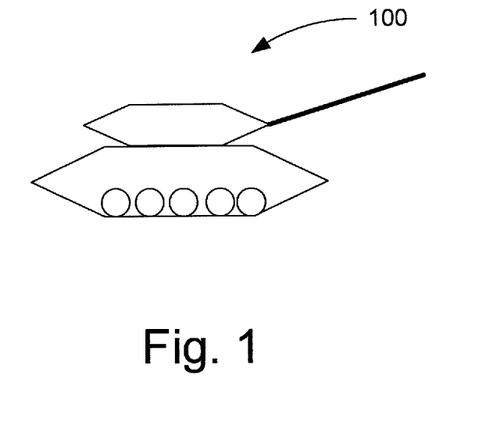

With reference to FIG. 1 there is illustrated a side view of a vehicle 100. The exemplified vehicle 100 constitutes according to an embodiment a terrain vehicle. Said vehicle 100 may be any suitable vehicle, for example a forest machine, a dumper, a wheel loader, a mining vehicle or any suitable military vehicle. According to an example embodiment said vehicle 100 may be a tank or a tracked vehicle. According to an example embodiment said vehicle 100 may be a utility vehicle. The vehicle may be a heavy vehicle, such as a truck or a bus. The vehicle may alternatively be a passenger car.

Herein the term "link" refers to a communication link which may be a physical wire, such as an optoelectronic communication wire, or a non-physical wire, such as a wireless connection, for example a radio- or microwave link.

Figure 2A:
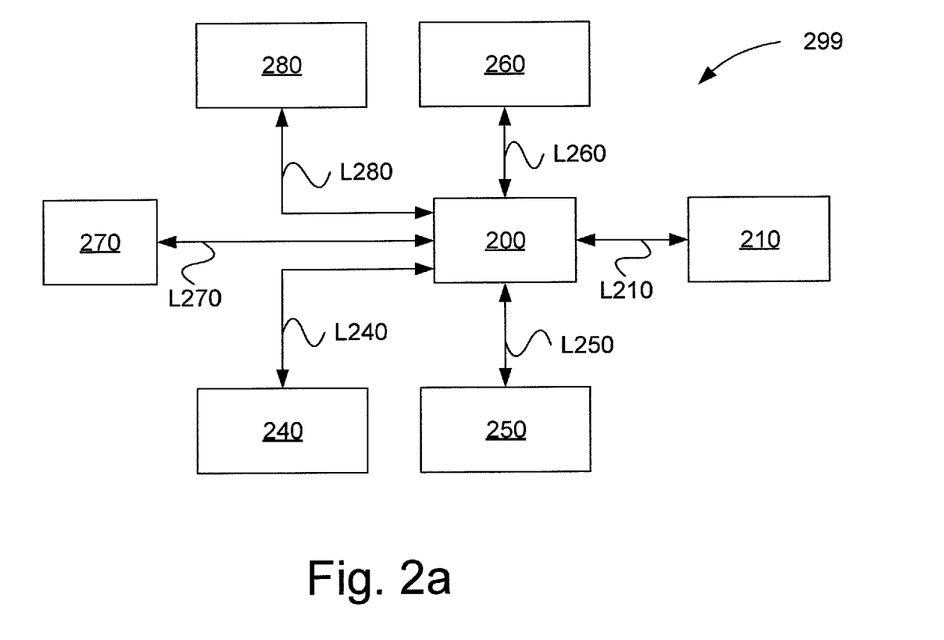
FIG. 2a schematically illustrates a device, according to an aspect of the present invention.

With reference to FIG. 2a there is illustrated a device 299 of the vehicle 100. The device 299 is arranged in the vehicle 100. The device 299 comprises a first control unit 200. The device 299 comprises a second control unit 210. The second control unit 210 is arranged for communication with first control unit 200 via a link L210.

The term basic configuration considers according to one definition herein a configuration of said vehicle which is substantially minimal regarding size. Herein all systems of the vehicle 100 are located in a folded position. Alternatively all systems of the vehicle are positioned in such a way that they affect the size of the vehicle minimally. Herein systems, or parts of systems, do not project from said basic configuration.

The term basic configuration herein means in according to definition an arbitrarily suitable configuration of the vehicle 100. Said basic configuration may be a predetermined configuration of the vehicle.

Said basic configuration may comprise systems of the vehicle and relating parameters and position of said systems of the vehicle relative a reference point. According to an example such a system maybe a barrel, wherein associated parameters may be a size measure (for example length and a caliber), rotation angle and/or elevation angle. Said basic configuration may be stored in a memory of the first control unit 200.

The term total configuration according to a definition herein relates to a present configuration of the vehicle 100, where portions of systems of the vehicle may project outside said basic configuration.

Said total configuration may comprise systems of the vehicle and relating parameters and position for said systems of the vehicle relative a reference point. According to an example such a system may be a barrel, wherein associated parameters may be a size measure (for example length and caliber), rotation angle and/or elevation angle. Said total configuration may be determined continuously and stored in a memory of the first control unit 200.

A positioning system 240 is arranged for communication with the first control unit 200 via a link L240. Said positioning system 240 may comprise a GPS unit. Said positioning system 240 is arranged for continuously determining a present position of said vehicle 100. Said positioning system 240 is arranged for continuously determining a current speed of said vehicle 100. Said positioning system 240 is arranged to continuously send signals S240 comprising said current position and/or said speed regarding the vehicle 100 to the first control unit 200.

A sensor configuration 250 is arranged for communication with the first control unit 200 via a link L250. The sensor configuration 250 is arranged for continuously detecting a surrounding configuration. The sensor configuration 250 is arranged for continuously determining propulsion characteristics of the vehicle 100. The sensor configuration 250 is arranged for continuously generating signals S250 comprising said surrounding characteristics and/or propulsion characteristics of the vehicle 100. The sensor configuration 250 is arranged to continuously send a signal S250 comprising said information to the first control unit 200 via the link L250.

According to an embodiment said sensor configuration 250 is arranged for in real time sending signals S250 comprising said information via the first control unit 200 to the second control unit 210 via said link L250 and a link L210, respectively. Herein said sensor configuration 250 is arranged for in real time transmitting such information directly to said second control unit 210.

The first control unit 200 is arranged for determining suitable propulsion of the vehicle 100 on the basis of said surrounding configuration and/or said propulsion characteristics. The first control unit 200 is arranged to in a suitable way communicate information about said determined suitable propulsion to at least one operator of said vehicle 100. According to an embodiment said vehicle 100 may hereby be controlled automatically on the basis of said determined suitable propulsion. Said suitable propulsion may comprise speed, changes of speed, travel direction and/or changes of travel direction.

Said sensor configuration 250 may comprise suitable sensors. Said sensor configuration 250 may comprise a suitable number of sensors. Said sensor configuration 250 may comprise a suitable set of different sensors. Said sensor configuration 250 may comprise a camera. Said sensor configuration 250 may be a video camera. Said sensor configuration 250 is arranged to detect surrounding characteristics comprising objects, terrain, various kinds of obstacles for the vehicle 100, etc. Said sensor configuration 250 is arranged for continuously determining a surrounding configuration comprising objects, terrains, various kinds of obstacles for the vehicle 100, etc. Said first control unit 200 may be arranged for determining said surrounding configuration on the basis of signals received from the sensor configuration 250.

Said sensor configuration 250 may comprise suitable sensors for determining propulsion characteristics regarding said vehicle 100. Examples of such sensors may be steering wheel sensor, accelerator sensor, breaking sensors, speed sensors, etc.

Figure 2B:
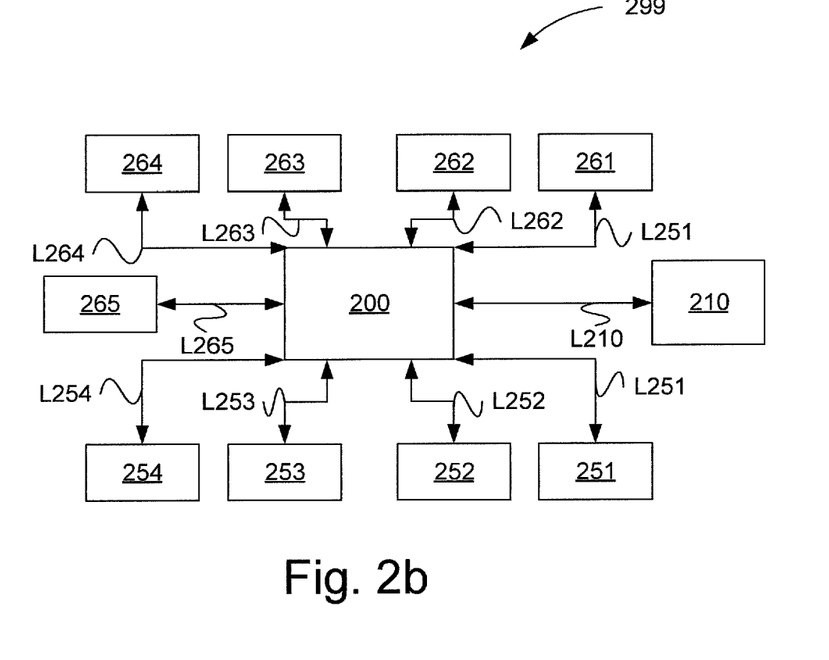
FIG. 2b schematically illustrates a device, according to an aspect of the present invention.

Said sensor configuration 250 is depicted in greater detail with reference to for example FIG. 2*b*.

A system configuration 260 is arranged for communication with the first control unit 200 via a link L260. The system configuration 260 is arranged to continuously send signals S260 comprising information about current state and position regarding systems being comprised in in said system configuration 260 to the first control unit 200. Said current states and positions may comprise information about orientation of said system. Said current state and position may comprise information about how said system configuration is projecting relatively a basic configuration of the vehicle 100. For example said states and positions may comprise orientation of a tower of a tank and information about current angle of a barrel being carried by said tower.

Said system configuration 260 may comprise suitable systems. Said systems configuration 260 may comprise a suitable number of systems. Said system configuration 260 may comprise suitable set of different systems. Said system configuration 260 may comprise a tower. Said system configuration 260 may comprise a barrel being carried by said tower. Said system configuration 260 is depicted in greater detail with reference to for example FIG. 2*b*.

A communication unit 270 is arranged for communication with the first control unit 200 via a link L270. An operator of the vehicle, for example a driver or tower operator, may feed information to the first control unit 200. Said information may comprise information about for example said basic configuration. Said communication unit 270 may be a suitable communication unit, for example comprising audio-visual means adapted for communication with the first control unit 200.

Presentation means 280 are arranged for communication with the first control unit 200 via a link L280. Said presentation means 280 may be a suitable communication unit, for example, comprising audio-visual means adapted for communication with the first control unit 200. Herein the first control unit 200 is arranged to, where applicable, feedback information regarding current or future collision risk regarding the vehicle and articles or objects in a determined surrounding configuration, for example trees, stones, buildings, roofs, sidewalls, vehicles, fixed installations, moveable platforms, etc.

With reference to FIG. 2*b* there is illustrated a device 299 of the vehicle 100. The device 299 is arranged in the vehicle 100. The device 299 comprises a first control unit 200. The device 299 comprises a second control unit 210. The second control unit 210 is arranged for communication with the first control unit 200 via a link L210.

Said first control unit 200 is arranged for determining a surrounding configuration as basis for collision risk determination. Said first control unit 200 is arranged for determining presence of portions projecting outside said basic configuration. Said first control unit 200 is arranged for determining if a collision risk is present at such determined surrounding configuration and the thus determined total vehicle configuration. Said first control unit 200 is arranged to indicate for an operator of the vehicle the thus determined collision risk.

Said first control unit 200 is arranged for determining suitable measures for managing the thus determined collision risk. Said first control unit 200 is arranged for presenting the thus determined measures for said operator. Said first control unit 200 is arranged to automatically update a set of parameters representing said basic configuration. According to an embodiment said control unit is arranged to update a set of parameters representing said basic configuration on the basis of information provided by an operator, which by suitable means may feed said information to said first control unit 200. Said first control unit 200 is arranged for determining said collision risk on the basis of said updated set of parameters. Said first control unit 200 is arranged for continuously determining said collision risk on the basis of among other things intended travel path of the vehicle.

Herein there is illustrated said positioning system 240, which is depicted in greater detail with reference to FIG. 2*a* above.

A first sensor configuration 251 is arranged for communication with the first control unit 200 via a link L251. According to an embodiment said first sensor configuration 251 comprises a number of cameras, such as for example video cameras. Said plurality of cameras may be set so that they continuously are filming various field of views for determining said surrounding configuration. Said field of views may at least partially be overlapping.

According to an embodiment said first sensor configuration 251 comprises an IR camera for determining presence of external objects and thereto connected distance and/or changes of distance regarding the vehicle and said object. Said IR camera may be arranged to continuously determining a distance to an external object.

The first sensor configuration 251 may according to an embodiment comprise a camera unit for in a surrounding configuration determining presence of relative the vehicle 100 external objects and thereto associated distances and/or changes of distances regarding the vehicle and said objects. The camera unit may be arranged to continuously determining a distance to external objects, for example stationary or movable objects. Hereby a distance to an object may be determined, wherein a control system of the vehicle automatically may control operation of the vehicle 100 so as to avoid a collision with said object. Hereby it alternatively may be determined if collision risk with said object is present, wherein suitable feedback to an operator of the vehicle may be performed in a suitable way.

A second sensor configuration 252 is arranged for communication with the first control unit 200 via a link L252. According to an embodiment said second sensor configuration 252 comprises a number of distance sensors and/or a velocity sensor. The second sensor configuration 252 may according to an embodiment comprise a radar unit for in a surrounding configuration determining presence of to the vehicle external objects and thereto associated distances and/or changes of distances regarding the vehicle and said object. The radar unit may be arranged to continuously determining a distance to external objects, for example stationary or movable objects. Herein a distance to an object may be determined, wherein a control system of the vehicle automatically may control operation of the vehicle 100 so as to avoid collision with said object. Herein it may alternatively be determined if collision risk with said object is present, wherein suitable feedback to an operator of the vehicle may be performed in a suitable way.

A third sensor configuration 253 is arranged for communication with the first control unit 200 via a link L253. According to an embodiment said sensor configuration 254 comprises at least one laser unit for at a surrounding configuration determining presence of external objects and thereto associated distances and/or changes of distances regarding the vehicle and said objects. The laser unit may be arranged to continuously determining a distance to external objects, for example stationary or movable objects. Herein a distance to an object may be determined, wherein a control system of the vehicle automatically may control operation of the vehicle 100 so as to avoid collision with said object. Herein it may alternatively be determined if collision risk with said object is present, wherein suitable feedback to an operator of the vehicle may be performed in a suitable way.

A fourth sensor configuration 254 is arranged for communication with the first control unit 200 via a link L254. According to an embodiment said sensor configuration 254 comprises an ultrasound unit for at a surrounding configuration determining presence of external objects and thereto associated distances and/or changes of distances regarding the vehicle and said object. The ultrasound unit may be arranged to continuously determining a distance to external objects, for example stationary or movable objects. Herein a distance to an object may be determined, wherein a control system of the vehicle automatically may control operation of the vehicle 100 so as to avoid collision with said objects. Herein it may alternatively be determined if collision risk with said object is present, wherein suitable feedback to an operator of the vehicle may be performed in a suitable way.

The first control unit 200 comprises an analysis program for determining said surrounding configuration based on information detected by said first sensor configuration 251. Said analysis program may comprise a suitable image processing program.

A first system configuration 261 is arranged for communication with the first control unit 200 via a link L261. The first system configuration 261 comprises a pivotally arranged tower, such as a tank tower. The first system configuration 261 is arranged to continuously send signals S261 comprising information about a rotation angle relative a reference angle to the first control unit 200. Hereby the information about the rotation angle of the tower may continuously be provided to the first control unit 200. The first control unit 200 is hereby arranged to continuously determining presence of potential portions of said first system configuration 261 projecting out from said basic configuration of the vehicle 100.

A second system configuration 262 is arranged for communication with the first control unit 200 via a link L262. The second system configuration 262 comprises a vertically adjustable barrel carried by said tower 261. The second system configuration 262 is arranged for continuously sending signals S262 comprising information about an elevation angle of the barrel relative a reference angle to the first control unit 200. Hereby information about the elevation angle of the barrel may be continuously provided to the first control unit 200. The first control unit 200 is hereby arranged to continuously determining presence of potential portions of said second system operation 262 projecting out from said basic configuration of the vehicle 100.

A third system configuration 263 is arranged for communication with the first control unit 200 via a link L263. The third system configuration 263 comprises a number of communication means. The third system configuration 263 is arranged to continuously send signals S263 comprising information about position of said communication means. Said communication means may be foldable arranged. Said communication means may for example comprise a parabolic areal, antenna, radar equipment or mast. Hereby information about position and state of said communication means continuously may be provided to the first control unit 200. The first control unit 200 is hereby arranged to continuously determining presence of potential portions of said third system configuration 263 projecting out from said basic configuration of the vehicle 100.

A fourth system configuration 264 is arranged for communication with the first control unit 200 via a link L264. The fourth system configuration 264 comprises a number of weapon systems. The fourth system configuration 264 is arranged to continuously send signals S264 comprising information about position of said weapon systems. Said weapon systems may be foldable arranged. Said weapon systems may for example comprise a robot device, missile device, anti-aircraft device, automatic guns, launching devices, etc. Hereby information about position and state of said weapon systems continuously may be provided to the first control unit 200. The first control unit 200 is hereby arranged for continuously determining presence of potential portions of said fourth system configuration 264 projecting out from said basic configuration of the vehicle 100.

A fifth system configuration 265 is arranged for communication with the first control unit 200 via a link L265. The fifth system configuration 265 comprises a number of counter measure systems. The fifth system configuration 265 is arranged to continuously send signals S65 comprising information about position of said counter measure systems. Said counter measure systems may be foldable arranged. Said counter measure systems may for example comprise a smoke grenade launcher, etc. Herein information about position and state of said counter measure system may continuously be provided to the first control unit 200. The first control unit 200 is hereby arranged for continuously determining presence of potential portions of said fifth system configuration 265 projecting out from said basic configuration of the vehicle 100.

Said communications unit 270 is illustrated in FIG. 2a. Said communication unit 270 may be used by an operator of the vehicle 100 for feeding required information to the first control unit 200. According to an example said information may comprise information about a basic configuration of the vehicle 100. Hereby a basic configuration regarding the vehicle may be set and/or, where applicable, updated.

Said communications unit 270 may be formed integrally with said presentation means 280. According to an embodiment there is provided a number of communication unit 270, wherein different operators of the vehicle may use respective communication unit 270 and/or presentation means 280.

Presentation means 280 is arranged for communication with the first control unit 200 via a link L280. The presentation means 280 may comprise a presentation screen. The presentation means 280 is arranged to continuously receive transmitted signals S200 comprising said surrounding configuration and/or propulsion characteristics, and/or advices regarding future propulsion and/or instructions regarding future propulsion and/or advices regarding said suitable measures and/or instructions regarding suitable measures from the first control unit 200. Said signal S200 may comprise for example a video stream from said first sensor configuration. The presentation means 280 may be arranged to in real time present said received video stream, so that at least one field of view present in said vehicle continuously is made available for a driver and/or other operator of the vehicle 100.

According to an embodiment the presentations means 280 may be arranged to present several video recordings simultaneously, in different windows of the presentation screen. The size of the windows of the respective video streams from respective field of view from said vehicle may be set in a suitable way.

According to an embodiment there is presented said advices and/or instructions as overlaid information on said presentation screen.

Said presentation means 280 may comprise a detachably connected presentation screen. Said presentation means 280 may constitute an integrated part of the vehicle 100, for example as on a dashboard of the vehicle. Alternatively said presentation means may be arranged integrally at a sight or a periscope of the vehicle.

Said presentation means 280 may comprise loudspeakers, for example in the form of a so called headset, for presenting at least parts of said information for at least one operator of the vehicle 100. Said presentation means 280 may present instructions and/or advices in form of audio signals or synthetized speech. Said instruction and/or advices may be determined by said first control unit 200. Said instructions may be determined on the basis of said surrounding configuration and/or said propulsion characteristics.

According to an example embodiment said presentation means comprises suitable signalling devices, for example comprising at least one lamp configuration. Said lamp configuration may be arranged at the vehicle at a suitable position. Said lamp configuration may comprise a suitable set of for example light emitting diodes. Said lamp configuration may comprise a suitable number of different light emitting diodes, which may be arranged to present light with a respective predetermined wavelength, for example green, yellow or red light.

According to this example embodiment there is provided three lamps. A first lamp is hereby arranged to, upon presentation of information, emit green light. During green light it is indicated hereby that no collision risk is present between the vehicle and the surrounding configuration.

A second lamp is hereby arranged, upon presentation of information, to emit yellow or orange light. By yellow or orange light it is indicated hereby that certain collision risk is present between the vehicle and a surrounding configuration.

A third lamp is hereby arranged to, upon presentation of information, emit red light. By red light it is hereby indicated that immediate or close to immediate collision risk is present between the vehicle and a surrounding configuration.

According to an example one lamp which is arranged to emit light with different colours may replace or complement the three lamps depicted above.

A second control unit 210 is arranged for communication with the first control unit 200 via a link L210. The second control unit 210 may be detachably connected to the first control unit 200. The second control unit 210 might be one to the vehicle 100 external control unit. The second control unit 210 may be arranged to perform the inventive method steps. The second control unit 210 may be used for transferring program code to the first control unit 210, in particularly program code for performing the inventive method. The second control unit 210 may alternatively be arranged for communication with the first control unit via a vehicle internal network. The second control unit 210 may be arranged to perform substantially the same functions as the first control unit 200, such as for example:

determining a surrounding configuration as basis for collision risk determination; and determining presence of portions projecting outside said basic configuration;

determining if collision risk is present at the thus determined surrounding configuration and the thus determined total vehicle configuration; and for an operator of an vehicle, indicating the thus determined collision risk.

Figure 3A:
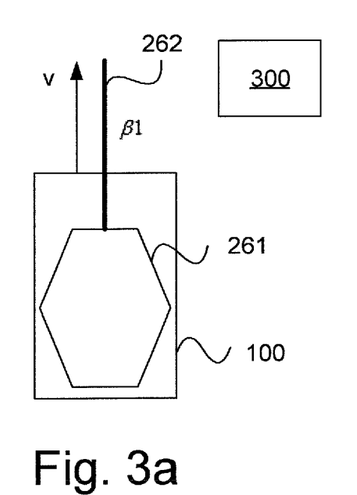
FIG. 3a schematically illustrates a situation for a vehicle according to an aspect of the invention.

FIG. 3a schematically illustrates a situation for a vehicle 100. Said vehicle is hereby exemplified as a combat vehicle with a barrel 262 carried by a pivotable tower 261.

The vehicle 100 hereby has by means of said sensor configuration 250 detected an object 300 in a surrounding configuration. According to this example said object is a five meter high tower with rectangular cross section area of two times four meters. The vehicle 100 hereby presents a basic configuration wherein said barrel 262 is aiming forwardly in a travel direction of the vehicle. Said barrel 262 and tower 261 hereby present a rotation angle of β1 degrees. β1 is hereby substantially 0 degrees. The vehicles current speed v is indicated hereby.

For the case intended travel path is essentially straight forward, no collision risk between said barrel 262 and said object 300 will be present, whereby no indication regarding collision risk needs to be presented for an operator of an vehicle 100. Alternatively an indication comprises information about that no collision risk is presented for said operator. Alternatively an indication comprising information about that it is not suitable to turn to the right in the travel path of the vehicle may be presented.

Figure 3B:
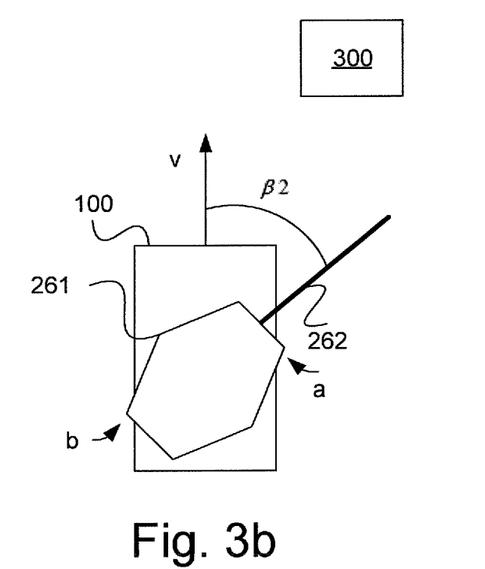
FIG. 3b schematically illustrates a situation for a vehicle according to an aspect of the invention.

FIG. 3b schematically illustrates a situation for a vehicle 100. Said vehicle is hereby exemplified as a combat vehicle with a barrel 262 carried by a pivotable tower 261.

The vehicle 100 hereby by means of said sensor configuration 250 has detected an object 300 in a surrounding configuration. According to this example said object is a 5 meter high tower with rectangular cross-section area of 2 times 4 meters. The vehicle 100 hereby presents a total configuration which is not the same as the vehicle basic configuration. Hereby said tower 261 carrying said barrel 262 is rotated to the right with an angle β2 relative a reference direction, where said reference direction is in a longitudinal axis of the vehicle, i.e. forward in a travel direction of the vehicle. Said barrel 262 and tower 261 hereby present said rotation angle of β2. β2 is hereby essentially 45 degrees. The current speed v of the vehicle is indicated hereby.

In the case said intended travel path is substantially straight forward immediate collision risk between said barrel 262 and said object 300 is present, whereby indication regarding collision risk needs to be presented to an operator of the vehicle 100. Alternatively an indication comprising information about that the vehicle, because of said provision of collision risk, needs to be braked or driven by turning to the left relative the vehicle current travel direction, is presented for said operator. Alternatively, an indication may comprise information about the tower 261 carrying said barrel 262 needs to be rotated in a suitable way to avoid collision with said object 300.

In FIG. 3*b* there is further illustrated that two portions, namely a first portions A and a second portion B, of said tower 261 are projecting from said basic configuration.

Figure 3C:
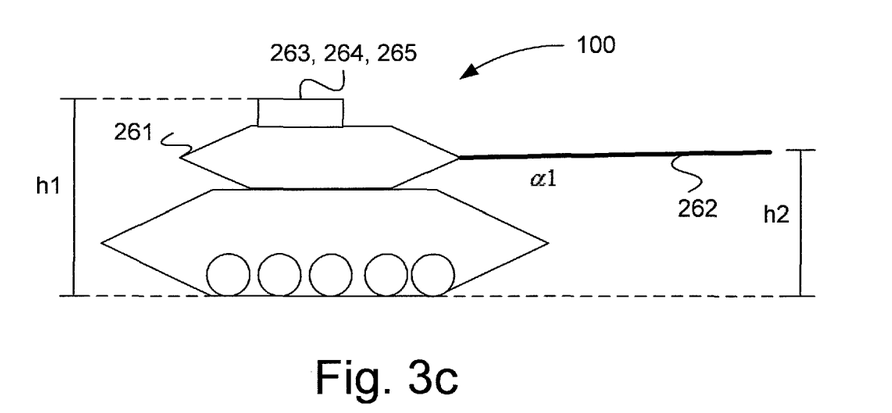
FIG. 3c schematically illustrates a situation for a vehicle according to an aspect of the invention.

FIG. 3*c* schematically illustrates a vehicle 100, which is a tank. The vehicle 100 presents a pivotable tower 261 carrying a barrel 262. The vehicle also presents a system configuration 260. According to an embodiment said system configuration may comprise at least one of the third system configuration 263, fourth system configuration 264, or fifth system configuration 265. Hereby said system configuration 260 is in a folded position. Said barrel 262 is hereby in a first position, where a first elevation angle α1 is essentially 0 relative a reference direction.

The vehicle 100 hereby presents a basic configuration, wherein a first height h1 defines a distance between a ground level and an upper side of the system configuration 260. A second height h2 further defines a distance between a ground level and portion of the barrel 262 in said second position.

Figure 3D:
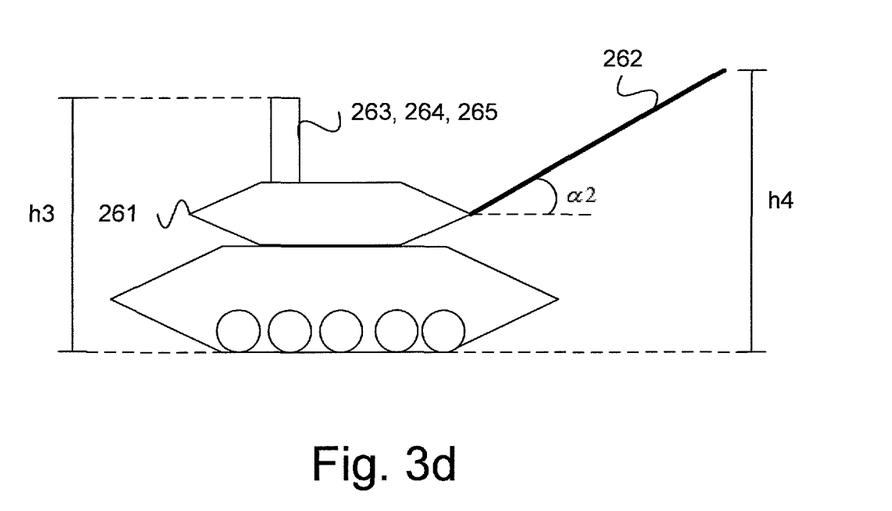
FIG. 3d schematically illustrates a situation for a vehicle according to an aspect of the invention.

FIG. 3*d* schematically illustrates a vehicle 100, which is a tank. The vehicle 100 presents a pivotable tower 261 carrying a barrel 262. The vehicle presents also a system configuration 260. According to an embodiment said system configuration may comprise at least one of the third system configuration 263, fourth system configuration 264, or fifth system configuration 265. Hereby said system configuration 260 is in an unfolded position. Said barrel 262 is hereby in a second position, wherein a second elevation angle α2 is essentially 30 degrees relative a reference direction.

The vehicle 100 hereby presents a total configuration which deviates from said basic configuration (such as one for example being presented with reference to FIG. 3*c*), wherein a third height h3 defines a distance between a ground level and an upper side of the system configuration 260 in that unfolded position. A fourth height h4 is further defining a distance between a ground level and an end portion of the barrel 262 in said second position.

Hereby both the system configuration 260 and said barrel project from said basic configuration. Upon determining collision risk between said system configuration 260 and an object of a determined surrounding configuration the height measure h3 thus may be used. Upon determination of collision risk between said barrel 262 and an object of a determined surrounding configuration the height measure h4 may thus be used.

Hereby h3 is shorter than h4, why the height H4 defines the total height of the vehicle above ground level. Depending on objects of the determined surrounding configuration various suitable measures may be determined for presentation for an operator of the vehicle 100. According to this example said measures may pertain to controlling said barrel 262, tower 261 and/or system configuration 260. Said measures may be alternatively or as a complement pertain to suitable propulsion of the vehicle 100, comprising changes of vehicle speed.

Figure 4A:
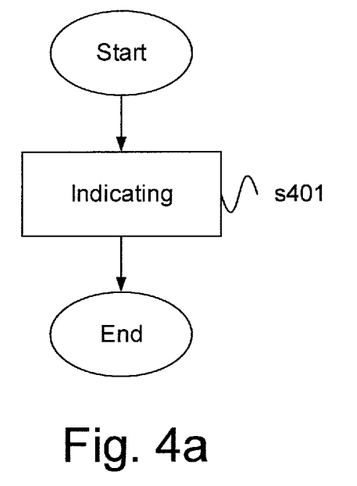
FIG. 4a schematically illustrates a flow chart of a method, according to an embodiment of the invention.

FIG. 4*a* schematically illustrates a flowchart for a method for collision risk management pertaining to vehicles comprising portions projecting outside a basic configuration of said vehicle, which portions temporarily may change said basic configuration, according to an embodiment of the invention. The method comprises a first method step s401. The step s401 comprises the steps of:
- determining a surrounding configuration as basis for collision risk determination; and
- determining presence of portions projecting outside said basic configuration;
- determining if collision risk is present at the thus determined configuration and thus determined total vehicle configuration; and
- for an operator of a vehicle indicating said thus determined collision risk.

After the step s401 the method ends.

Figure 4B:
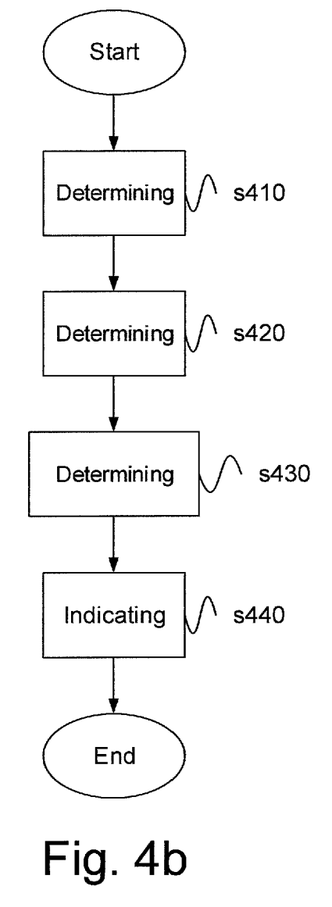
FIG. 4b in greater detail schematically illustrates a flow chart over a method, according to an embodiment of the invention.

FIG. 4*b* schematically illustrates a flowchart for a method for collision risk management pertaining to vehicles comprising portions projecting outside a basic configuration of said vehicle, which portions temporarily may change said basic configuration, according to an embodiment of the invention.

The method comprises a first method step S410. The method step S410 comprises the step of determining a surrounding configuration as basis for collision risk determination. This may be performed by said sensor configuration 250, comprising at least one of the first sensor configuration 251, second sensor configuration 252, third sensor configuration 253 and fourth sensor configuration 254. Said determined surrounding configuration may be stored in a memory of the first control unit 200. In particular there is determined position and configuration of objects in said determined surrounding configuration. After the method step S410 there is performed a subsequent method step S420.

The method step S420 comprises the step of determining presence of portions projecting outside said basic configuration. This may be performed by means of said system configuration 260, comprising at least one of said first system configuration 261, second system configuration 262, third system configuration 263, fourth system configuration 264 and fifth system configuration 265. After the method step S420 there is performed a subsequent method step S430.

The method step S430 comprises the step of determining if collision risk is present at the thus determined surrounding configuration and the thus determined total vehicle configuration. This may be performed by means of routines stored at the first control unit 200. The step of determining if collision risk is present may be performed in a suitable way on the basis of said determined total vehicle configuration and said determined surrounding configuration. The step S430 may comprise the step of updating a set of parameters representing said basic configuration. This may be performed by means of said communication unit 270. The step S430 may comprise the step of determining said total vehicle configuration on the basis of said basic configuration. The step S430 may comprise the step of determining said total vehicle configuration on the basis of said updated basic configuration. The step S430 may comprise the step of determining said collision risk on the basis of said updated set of parameters. After the method step S430 there is performed a subsequent method step S440.

The method step S440 comprises the step of for an operator of a vehicle indicating the thus determined collision risk. This may be performed by means of said presentation means 280. The method step S440 may comprise the step of determining suitable measures for managing the thus determined collision risk. The method step S440 comprises the step of presenting the thus determined measures for said operator.

After the method step S440 the method ends.

Figure 5:
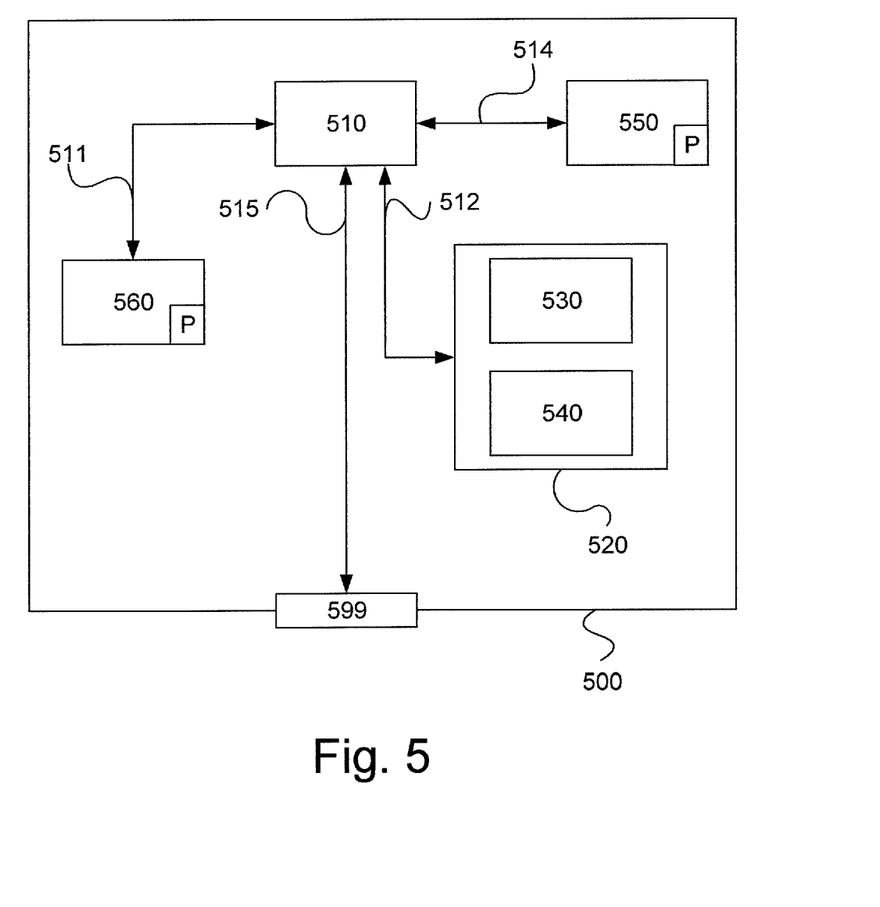
FIG. 5 schematically illustrates a computer, according to an embodiment of the invention.

With reference to FIG. 5 there is illustrated a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 200. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P which comprises routines for collision risk management pertaining to a vehicle 100 comprising portions projecting outside a basic configuration of said vehicle 100, which portions temporarily may change said basic configuration, according to an aspect of the innovative method.

The computer program P comprises routines for determining a surrounding configuration as basis for collision risk determination. The computer program P comprises routines for determining presence of portions projecting outside said basic configuration. The computer program P comprises routines for determining if collision risk is present at the thus determined surrounding configuration and the thus determined total vehicle configuration. The computer program P comprises routines for an operator of the vehicle indicating said thus determined collision risk.

The computer program P can comprise routines for determining suitable measures for managing the thus determined collision risk. The computer program P comprises routines for presenting the thus determined measures for said operator.

The computer program P comprises routines for determining a current position and/or velocity of the vehicle. The computer program P comprises routines for determining the vehicle configuration paying regard to said projecting portions. The computer program P comprises routines for determining changes of the propulsion of said vehicle and/or change of said determined vehicle configuration. The computer program P comprises routines for determining said measures on the basis of information about changes of the propulsion of said vehicle and/or changes of said determined vehicle configuration by means of said projecting portions.

The computer program P comprises routines for indicating the thus determined collision risk by visual presentation via a presentation screen and/or periscope.

The computer program P comprises routines for updating a set of parameters representing said basic configuration. The computer program P comprises routines for determining said collision risk on the basis of said updated set of parameters.

The computer program P comprises routines for continuously or intermittently determining the intended travel path of the vehicle. The computer program P comprises routines for continuously determining said collision risk on the basis of the intended travel path of the vehicle.

The computer program P comprises routines for continuously determining a solid angle of a pivotable and vertically adjustable barrel. The computer program P comprises routines for continuously determining an angle of rotation of a pivotable tower carrying said barrel.

The computer program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L240, L260, L270, L280, L251, L252, L253, L254, L261, L262, L263, L264 and L265, for example, may be connected to the data port 599 (see FIG. 2a and FIG. 2b).

When data are received on the data port 599, they are stored temporarily in the second memory element 540. When input data received have been temporarily stored, the data processing unit 510 will be prepared to conduct code execution as described above. According to one embodiment signals received on the data port 599 comprise information about a determined solid angle of a pivotable and vertically adjustable barrel. According to one embodiment signals received on the data port 599 comprise information about an angle of rotation of a pivotable tower carrying said barrel. According to one embodiment signals received on the data port 599 comprise information about a detected surrounding configuration. According to one embodiment signals received on the data port 599 comprise information about the determined total vehicle configuration.

The signals received on the data port 599 may be used by the device 500 for determining if collision risk is present at the thus determined surrounding configuration and the thus determined total vehicle configuration; and for an operator of the vehicle indicating the thus determined collision risk.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The invention claimed is:

1. A method for collision risk management pertaining to a vehicle comprising portions projecting outside a basic configuration of said vehicle, comprising the steps of:
    determining a surrounding configuration as basis for collision risk determination;

determining a total vehicle configuration based on presence of portions projecting outside said basic configuration;

determining if collision risk is present at the thus determined surrounding configuration and the thus determined total vehicle configuration;

for an operator of the vehicle, indicating the thus determined collision risk;

determining suggested measures for managing the thus determined collision risk; and presenting the thus determined suggested measures for said operator, wherein said suggested measures comprise changes of the propulsion of the vehicle.

2. Method according to claim 1, wherein said operator is a driver of said vehicle.

3. Method according to claim 1, wherein said operator is an operator for said projecting portions.

4. Method according to claim 1, wherein said suggested measures comprise changes of said determined vehicle configuration by means of said projecting portions.

5. Method according to claim 1, wherein the thus determined collision risk is indicated by at least one of visual presentation via presentation screen and periscope.

6. Method according to claim 1, comprising the steps of:
updating a set of parameters representing said basic configuration; and
determining said collision risk on the basis of said updated set of parameters.

7. Method according to claim 1, wherein said collision risk is determined continuously on the basis of intended travel path of the vehicle.

8. Method according to claim 1, wherein said projecting portions comprise a pivotable and vertically adjustable barrel and a pivotable tower carrying said barrel.

9. A device for collision risk management pertaining to a vehicle comprising portions projecting outside a basic configuration of said vehicle, comprising:
means for determining a surrounding configuration as basis for collision risk determination;
means for determining a total vehicle configuration based on presence of portions projecting outside said basic configuration;
means for determining if collision risk is present at the thus determined surrounding configuration and the thus determined total vehicle configuration;
means for indicating the thus determined collision risk for an operator of the vehicle;
means for determining suggested measures for managing the thus determined collision risk; and
means for presenting the thus determined suggested measures for said operator, wherein said suggested measures comprise changes of the propulsion of the vehicle.

10. The device according to claim 9, wherein said suggested measures comprise changes of said determined vehicle configuration by means of said projecting portions.

11. The device according to claim 9, comprising:
means for indicating the thus determined collision risk by visual presentation via at least one of presentation screen and periscope.

12. The device according to claim 9, comprising:
means for updating a set of parameters representing said basic configuration; and
means for determining said collision risk on the basis of said updated set of parameters.

13. The device according to claim 9, comprising:
means for continuously determining said collision risk on the basis of intended travel path of the vehicle.

14. The device according to claim 9, wherein said projecting portions comprise a pivotable and vertically adjustable barrel and a pivotable tower carrying said barrel.

15. A motor vehicle-comprising a device according to claim 9.

16. The motor vehicle according to claim 15, wherein the motor vehicle is any of a military vehicle, terrain vehicle, forest machine or mining vehicle.

17. A non-transitory computer program, wherein said computer program comprises a program code for causing an electronic control unit or an operational control unit connected to the electronic control unit to perform the steps according to claim 1.

18. A non-transitory computer program product comprising a program code stored on a computer readable medium for performing method steps according to claim 1, when said program code is run on an electronic control unit or another computer connected to the electronic control unit.

* * * * *